(12) United States Patent
Ogawa et al.

(10) Patent No.: US 7,467,781 B2
(45) Date of Patent: Dec. 23, 2008

(54) POPPET VALVE DEVICE AND ELECTRONIC CONTROLLED FUEL INJECTION APPARATUS EQUIPPED WITH THE DEVICE

(75) Inventors: Hisao Ogawa, Sagamihara (JP); Takashi Kaneko, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 96 days.

(21) Appl. No.: 11/514,233

(22) Filed: Sep. 1, 2006

(65) Prior Publication Data

US 2006/0284127 A1    Dec. 21, 2006

Related U.S. Application Data

(62) Division of application No. 11/066,234, filed on Feb. 25, 2005.

(30) Foreign Application Priority Data

Feb. 27, 2004    (JP) .................. 2004-055202

(51) Int. Cl.
*F16K 31/02* (2006.01)
(52) U.S. Cl. ............. 251/129.15; 251/54; 137/625.33
(58) Field of Classification Search ............. 251/54, 251/129.07, 129.15; 137/625.33, 625.37
See application file for complete search history.

(56) References Cited

U.S. PATENT DOCUMENTS

| | | | |
|---|---|---|---|
| 4,572,433 A * | 2/1986 | Deckard | 239/88 |
| 5,927,257 A * | 7/1999 | Hackett | 123/568.26 |
| 6,024,060 A | 2/2000 | Buehrle et al. | |
| 6,145,805 A * | 11/2000 | Smith, III et al. | 251/48 |
| 6,848,630 B2 * | 2/2005 | Boecking | 239/96 |

FOREIGN PATENT DOCUMENTS

| | | |
|---|---|---|
| DE | 37 41 526 A1 | 6/1989 |
| EP | 0 816 672 A2 | 1/1998 |
| EP | 1 162 365 A1 | 12/2001 |

(Continued)

OTHER PUBLICATIONS

English translation of the equivalent parts of the corresponding Japanese Office Action JP 2004-055202, issued on Jun. 1, 2007.

*Primary Examiner*—John K Fristoe, Jr.
(74) *Attorney, Agent, or Firm*—Wenderoth, Lind & Ponack, L.L.P.

(57) ABSTRACT

A poppet valve device includes a plurality of axial passages of substantially the same diameter and length communicating with a high-pressure room formed inside a valve seat member between a poppet valve body and the valve seat member. The passages are located adjacent to each other and an annular gap formed between the periphery of the poppet valve body and an inner perimeter of a projecting part on which a valve seat face of the valve seat member is formed, is narrow to restrict liquid flow through the annular gap. An electronic controlled fuel injection apparatus equipped with the poppet valve device is composed such that a lower end part of the poppet valve body and a bottom of a valve device accommodating part of the fuel injection apparatus are formed to restrict flow of fuel to prevent the occurrence of bouncing.

5 Claims, 6 Drawing Sheets

FOREIGN PATENT DOCUMENTS

| | | |
|---|---|---|
| JP | 1-42262 | 9/1989 |
| JP | 2-35965 | 3/1990 |
| JP | 6-14464 | 1/1994 |
| JP | 6-11464 | 2/1994 |
| JP | 2000-186648 | 7/2000 |
| JP | 2001-20822 | 1/2001 |
| JP | 2001-173540 | 6/2001 |
| JP | 2001-248479 | 9/2001 |
| JP | 2002-98024 | 4/2002 |

* cited by examiner

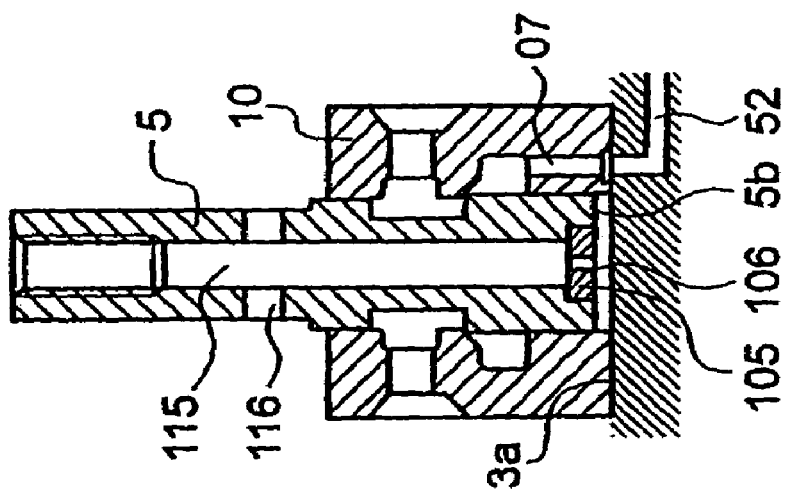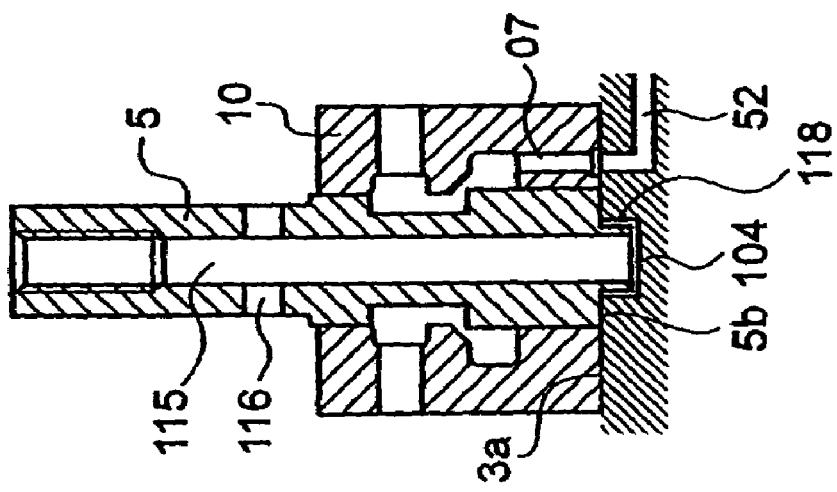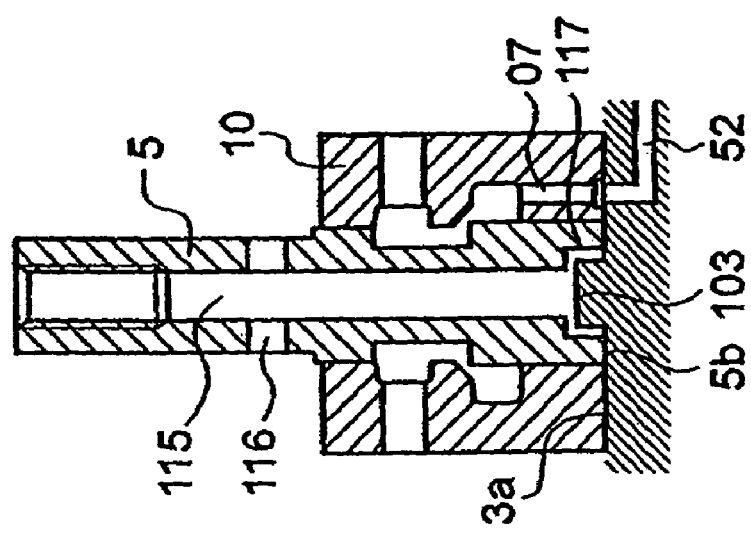

POPPET VALVE DEVICE AND ELECTRONIC CONTROLLED FUEL INJECTION APPARATUS EQUIPPED WITH THE DEVICE

This is a divisional of U.S. patent application Ser. No. 11/066,234, filed Feb. 25, 2005.

BACKGROUND OF THE INVENTION

1. Field of the Invention

The present invention relates to a poppet valve device for performing opening and closing of a high-pressure liquid passage, specifically to a poppet valve device to control the injection timing of the electronic controlled fuel injection apparatus for an internal combustion engine.

2. Description of the Related Art

In diesel engines, electronic controlled fuel injection apparatuses are widely used recently as effective means for reducing atmospheric pollutant such as NOx (nitrogen oxides) and HC(hydrocarbons) (for example, see Japanese Laid-Open Patent Application Nos 2001-248479 and 2002-98024).

A poppet valve device driven by an electromagnetic valve device is used in each of these apparatuses for opening and closing the fuel passage in the apparatus.

FIG. 6 represents an example of a unit injector type electronic controlled fuel injection apparatus for a diesel engine. The unit injector like this is well known in the art and here brief explanation will be given. In the drawing, reference numeral 100 comprises a fuel injection pump part 101 and a fuel injection nozzle part 102. The fuel injection pump part 101 includes a poppet valve 5, and an electromagnetic valve device 20 for opening and closing the valve. A plunger 1 fitted into a pump case 3 is driven to reciprocate by way of a tappet 6, contact piece 7, plunger spring 8, etc. by means of a rocker arm 54 which is driven mechanically by the engine crank shaft to oscillate. A plunger chamber 25 is communicated to the injection nozzle part 102 via a fuel passage 052 on one side and communicated to the poppet valve 5 via a fuel passage 52 on the other side. The fuel passage 52 is communicated or discommunicated to a fuel passage 12 connecting to a fuel tank (not shown in the drawing) by opening or closing of the poppet valve 5 which is opened or closed by the electromagnetic valve device 20. The fuel injection nozzle part 102 includes a fuel injection nozzle 2, and a needle valve spring 51. The fuel pushed by a plunger 1 to be compressed in the plunger chamber 25 reaches through the fuel passage 052 to a fuel pool 02 and injected from the injection holes 02a.

When the poppet valve 5 is opened, the pressure in the plunger chamber 25 does not increase by a down stroke of the plunger 1 because the plunger chamber 25 is communicated to the fuel tank through the fuel passage 52, the poppet valve which is opened, and the fuel passage 12. When the poppet valve 5 is closed, the pressure in the plunger chamber 25 increases as the plunger 1 moves down, and when the pressure in the fuel pool 02 reaches the needle-opening pressure, the needle valve 4 lifts up overcoming the spring force of the needle valve spring 51 and the fuel begins to be injected from the injection holes 02a. During fuel injection period, the amount of fuel compressed by the plunger is larger than that injected from the injection holes 02a of the injection nozzle 2 and the injection pressure increases with time. When the poppet valve is opened to communicate the plunger chamber 25 to the fuel tank, the pressure in the plunger chamber decreases rapidly, the pressure in the fuel pool 02 decreases rapidly, the needle valve is pushed down by the spring force of the needle valve spring 51 for the needle valve to be closed, and the injection is finished. In the succeeding lifting stroke of the plunger, fuel is sucked into the plunger chamber 25 through the fuel passage 12, poppet valve 5 which is opened, and fuel passage 52.

An example of the conventional poppet valve used in an electronic controlled fuel injection apparatus for the purpose as above described is shown in FIG. 7(A) and FIG. 7(B) together with an electromagnetic valve. FIG. 7(A) shows the state the popped valve is opened, and FIG. 7(B) shows the state the poppet valve is closed. In the drawings, reference numeral 20 is an electromagnetic valve device, 3 is the pump case of a unit injector as explained above, 52 is a fuel passage communicating to the plunger chamber of the unit injector. In the electromagnetic valve device 20, reference numeral 31 and 16 are valve cases, 031 is a solenoid room inside the valve case 31, 28 is a solenoid accommodated in the solenoid room 031. In an armature room 30, an armature 27 is fixed to the top of the popped valve 5 by means of a bolt 29.

Reference numeral 10 is a valve seat member and fixed in the pump case 3 by means of a fixing screw member 015. Reference numeral 033 is a passage hole drilled in the valve seat member 10 in the radial direction and allows an annular recession 05 of the poppet valve to communicate to an annular recession 17 of valve seat member 10, the recessions 05 and 17 being explained later. Reference numeral 5 is a poppet valve which is fit in through-hole of the valve seat member 10 for sliding and to the top of which is fixed an armature 27 by means of a bolt 29. Reference numeral 14 is a poppet valve spring disposed between the shoulder part of the poppet valve 5 and the ceiling part of the fixing screw member 015. The poppet valve 5 is pushed downward in the direction for the poppet valve 5 to be opened, that is, in the reverse direction of the attraction force of the armature 27. Reference numeral 05 is an annular recession formed along the periphery of the poppet valve 5, and reference numeral 17 is an annular recession formed along the periphery of the valve seat member 10. Reference numeral 12 is a supply and drain passage, one side thereof communicating to the annular recession 17 and the other side being connected to a fuel tank (not shown in the drawings). Reference numeral 10a is a seat face in the valve seat member 10, 5a is a seat face of the poppet valve 5. The seat face 5a of the poppet valve sits on the seat face 10a of the valve seat member when closing the poppet valve. According as the seat face 5a sits on or departs from the seat face 10a of the valve seat member 10, supply and drain passage 12 is discommunicated or communicated to a fuel passage 52 in the pump case 3. Reference numeral 07 is an axial passage communicating to an annular recession 06 formed along the inside circumference of the valve seat member 10, the axial passage 07 communicating to the fuel passage 52 which communicates to the plunger chamber of an injection pump not shown in FIG. 7(A), FIG. 7(B). When the poppet valve 5 is closed, the fuel pressure is high in the recession 06 and low in the recession 05.

When electric current is shut off from flowing to the solenoid 28 of the electromagnetic valve device 20, the poppet valve is pushed down by the spring force of the poppet valve spring 14, a gap "S" is developed between the upper surface of the armature 27 and the lower surface of the solenoid 28, the lower end face 5b of the poppet valve 5 contacts the bottom face 3a of the poppet valve device accommodating part of the pump case, the seat face 5a of the poppet valve 5 departs from the seat face 10a of the valve seat member 10, and the poppet valve is opened. Therefore, the plunger chamber 25 (see FIG. 6) is communicated to the supply and drain passage 12 through the fuel passage 52, the gap between the seat face 5a and 10a developed by the departing of the seat face 5a from the seat face 10a, the passage hole 033 of the valve seat member 10, and the annular recession 17, and the fuel pushed down in the plunger chamber 25 as the plunger 1 (see FIG. 6) moves down is returned to the fuel tank via the fuel supply and drain pipe 12. Accordingly, fuel is not injected by the down stroke of the plunger 1.

When electric current is flowed to the solenoid 28 of the electromagnetic valve device 20, the armature 27 and the poppet valve 5 connected thereto are lifted up by the attraction generated in the solenoid 28 against the spring force of the valve seat spring 14 until the seat face 5a of the poppet valve 5 sits on the seat face 10a of the valve seat member 10, and the poppet valve is closed. Then the pressure rises in the plunger chamber 25 as the plunger 1 moves down, and the fuel pushed out from the plunger chamber 25 is injected from the injection holes 02a of the injection nozzle 2.

In recent years, injection pressure is increasingly apt to be increased in order to enhance the effect of an electronic fuel injection apparatus to reduce atmospheric contaminant such as NOx and HC. The poppet valve device working in the electronic fuel injection apparatus as described above will be brought under severer working condition as fuel injection pressure increases.

However, with the poppet valve device of prior art, there are problems that cavitation erosion occurs in the poppet valve body and valve seat member due to the outburst of high-pressurized fuel through the gap of the valve seat part, that friction of sliding of the poppet valve body increases due to increased side thrust exerting to the poppet valve body, that a crack occurs in the passage exposed to high-pressure liquid in the valve device and that bouncing occurs when the poppet valve opens, that is, when the seat face of the poppet valve body departs from the seat face of the valve seat member and the lower end face of the poppet valve contacts the bottom face of the poppet valve device accommodating part of the injection pump case.

SUMMARY OF THE INVENTION

The present invention was made in light of the problems as above described, and the object is to provide a poppet valve device with which the occurrence of a crack in the passage exposed to high-pressure liquid in the valve device, occurrence of cavitation erosion in the poppet valve body and valve seat member of the valve device, increase in sliding friction of the poppet valve body, and the occurrence of bouncing of the poppet valve body can be prevented.

To solve the problems, the present invention proposes a poppet valve device for opening and closing a high-pressure liquid passage including a valve seat member and a poppet valve body inserted in the through-hole of the valve seat member for sliding. The device is composed such that the sitting of the seat face of the poppet valve body onto the seat face of the valve seat member separates an annular, high-pressure room from an annular, low-pressure room, where annular rooms are formed between the poppet valve body and valve seat member. The valve seat member has an axial passage communicating to the high-pressure room and a radial passage communicating to the low-pressure room, wherein the axial passage is formed into a plurality of passages of substantially the same diameter and length located adjacent to each other.

In the poppet valve device, the high-pressure room is exposed to high pressure liquid not always but temporarily, and the axial passage communicating to the high-pressure room is exposed to repetition of high pressure and low pressure. Conventionally, one axial passage has been provided in the valve seat member, and the radial thickness between periphery of the trough-hole (hereafter referred to the sliding surface) and the periphery of the axial passage is inevitably limited for space limitation. When the valve device was used for high-pressure injection apparatus, the part of the limited radial thickness cracked.

By providing a plurality of axial passages having a required passage area, the stress due to high pressure in the passages is dispersed and reduced. Therefore, cracks do not occur even if the thickness between the sliding surface and the periphery of the axial passage are the same as that in the case of conventional one axial passage. Further, as the diameter of each of the passages is reduced, the outer diameter of the annular, high-pressure room can be reduced. As a result, it is possible to reduce the volume of the high-pressure room.

To reduce the volume of high pressure room means that dead volume is reduced, which results in a sharp rise of injection pressure in the case of a fuel injection apparatus for example. That is, as the rate of rise of the pressure of the fuel compressed by the plunger is less reduced with smaller dead volume, the injection pressure rises faster with the same plunger diameter and the same plunger velocity.

Further, in the present invention, it is preferable that the axial passage is formed into a plurality of passages of substantially same diameter and length located axially symmetrically to the center axis of the valve device.

When the valve is closed, the poppet valve body experiences even pressure around its periphery from the liquid filling the high-pressure room. When the valve is opened, the liquid in the high-pressure room flows out into the low-pressure room and high-pressure liquid flows into the high-pressure room through the axial passage. When one axial passage is provided, the high-pressure liquid flow entering into the high-pressure room through the axial passage acts to push the poppet valve body, and a side thrust exerts in the sliding part of the poppet valve body and the through-hole of the valve seat member. Therefore, the resistance for the poppet valve body to slide is caused, which increases with increased liquid pressure in the axial passage. Further, the flow velocity in the annular gap between the seat faces is faster near the axial passage in the annular gap and slower at the part opposite to the axial passage. The uneven velocity distribution in the annual gap between the seat faces induces a decrease in discharge coefficient and increase in pressure loss.

By providing a plurality of axial passages of substantially the same diameter and length located in axial symmetry, the thrusts exerting on the poppet valve body are balanced because the high-pressure liquid enters into the high-pressure room axially symmetrically, and no resultant thrust exerts on the poppet valve body, as a result poppet valve body can move smoothly. Further, as a plurality of axial passages are provided, velocity distribution of flow in the gap between the seat faces approaches to more even distribution along the annular gap, and maximum velocity decreases with required flow rate through the gap secured. By this, the occurrence of cavitation erosion on the poppet valve body and valve seat member can be suppressed.

In the present invention, it is preferable that the radial width of the annular gap formed between the periphery of the poppet valve body in the middle part thereof and the inside perimeter of an annular projection of the valve seat member is narrowed to restrict liquid flow from the high-pressure room to the low-pressure room so that the occurrence of cavitation erosion is suppressed.

When the poppet valve opens, the liquid in the high-pressure room bursts out rapidly to the low-pressure room and cavitation bubbles are generated. Cavitation erosion occurs on the surface of the poppet valve body and valve seat member by the liquid hammer action induced by the extinction of the bubbles.

According to the invention, as the radial width of the annular gap connecting the high-pressure room to the low-pressure room is restricted, velocity distribution in the annual gap between the seat faces is more uniform resulting in reduced maximum flow velocity when the seat face of the poppet valve body departs from the seat face of the valve seat member. Moreover, liquid flows out from the high-pressure room to the low-pressure room passing through the annular gap between the seat faces, and the energy of the liquid flow passing through the annual gap between the seat faces to collide against the poppet valve body is suppressed, so that the occurrence of cavitation erosion is suppressed.

Further, the present invention proposes an electronic controlled fuel injection apparatus provided with the poppet valve device, wherein a valve seat member of the poppet valve device is fixed to a valve device accommodating part so that the bottom end of the valve seat member is in close contact with the bottom face of the valve device accommodating part. The poppet valve body of the valve device is forced by an elastic member in the direction of the seat face of the poppet valve body to depart from the seat face of the valve seat member, and an electromagnetic valve is provided so that the poppet valve is closed when the poppet valve body is attracted by the electromagnetic valve against the elastic force of the elastic member to allow the seat face of the poppet valve body to sit on the seat face of the valve seat member. The poppet valve is opened when the attraction of the electromagnetic valve is released to allow the seat face of the poppet valve body to depart from the seat face of the valve seat member. The electronic controlled fuel injection apparatus is characterized by the poppet valve device of the invention being mounted with the configuration of valve device mounting part the same as is in prior art.

It is preferable that the poppet valve body of the valve device has a central hollow for allowing the fuel leaked from the sliding part of the poppet valve body in the trough-hole of the valve seat member to escape to the poppet valve spring accommodating room. A cylindrical projection is formed on the bottom of the valve device accommodating part so that the cylindrical projection can fit in the central hollow of the poppet valve body with a small radial clearance, whereby the impact when the lower end face of the poppet valve body collides against the bottom face of the valve device accommodating part is lessened and the occurrence of bouncing of the poppet valve body is prevented.

In an electronic fuel injection apparatus, a poppet valve device is provided for controlling fuel injection timing in the fuel supply line of the apparatus to supply fuel to the fuel injection pump of the apparatus, and the timing of opening and closing of the valve device is electronically controlled by means of an electromagnetic valve and an elastic member (usually, a coil spring).

The valve is closed by lifting the poppet valve body by the attraction of the electromagnetic valve and opened by pushing down the poppet valve body by the spring force of the poppet valve spring until the lower end face of the poppet valve body is brought into contact with the bottom face of the valve device accommodating part of the injection pump case. When the valve is closed, there is formed a clearance between the lower end face of the poppet valve body and the bottom face of the valve device accommodating part, and the clearance is filled with the fuel leaked from the sliding part of the of the poppet valve body in the trough-hole of the valve seat member, so the fuel in the clearance must be exhausted from there in order to allow the lower end face of the poppet valve body to come into contact with the bottom face of the valve device accommodating part.

For this purpose, an escape hole for letting out the fuel to the space where the poppet valve spring is accommodated is provided in the poppet valve body. By providing a cylindrical projection on the bottom of the valve device accommodating part to fit into the escape hole with small radial clearance to form an annular clearance of small radial width when the poppet valve body comes down, the fuel in the clearance between the lower end face of the poppet valve body and the bottom face of the valve device accommodating part must pass through the annular clearance to escape through the escape hole, by which resistance is caused for the poppet valve body to move down, and the impact when the lower end face of the poppet valve body collides against the bottom of the valve device accommodating part is lessened.

If the height of the cylindrical projection is formed to be larger than the lift of the poppet valve body, the resistance due to fuel escape flow restriction acts all over the period the poppet valve body moves down. If the height is smaller than the lift of the poppet valve body, the resistance due to fuel escape flow restriction acts just before the lower end of the poppet valve body reaches the bottom of the valve device accommodating part, whereby both good responsibility of valve opening and lessening of the impact can be secured. Good responsibility means that fuel injection ends sharply.

By softening the impact, valve bouncing that the poppet valve body collides against the bottom of the valve device accommodating part and rebounds from the bottom is prevented.

It is required to prevent bouncing because bouncing of the poppet valve body causes pressure oscillation in the high-pressure passage between the valve device and the injection nozzle, which deteriorates the sharpness of injection end resulting in reduced engine performance.

In the present invention, it is suitable that the poppet valve body has a cylindrical projection smaller in diameter than that of the sliding part thereof at the lower end part thereof. A cylindrical recess is provided in the bottom of the valve device accommodating part so that the cylindrical projection can fit into the cylindrical recess with a small radial clearance to form an annular gap of small radial width when the poppet valve body moves down for opening the valve until the lower end face thereof comes into contact with the bottom face of the valve device accommodating part. Thus, when the lower end face of the poppet valve body collides against the bottom face of the device accommodating part an impact is reduced and the occurrence of bouncing of the poppet valve body is prevented.

It is also preferable that the poppet valve body is provided with a throttling member to throttle fuel flow into the central hollow of the poppet valve body. Thus, when the lower end face of the poppet valve body collides against the bottom face of the device accommodating part an impact is reduced and the occurrence of bouncing of the poppet valve body is prevented.

In this case, if the throttling hole of the throttling member is formed such that the upper (central hollow side) edge thereof is rounded or chamfered and the lower edge is not rounded nor chamfered, the poppet valve body is easy to move upward, and downward movement thereof is suppressed. Therefore, by properly rounding or chamfering the upper edge of the throttling hole, bouncing when valve closing and when valve opening can be properly controlled.

BRIEF DESCRIPTION OF THE DRAWINGS

FIG. 4(A), FIG. 4(B), and FIG. 4(C) are sectional views of a fourth embodiment and modified embodiments thereof of the poppet valve device according to the present invention.

DETAILED DESCRIPTION OF THE PREFERRED EMBODIMENTS

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

The First Embodiment

Figure 1A:
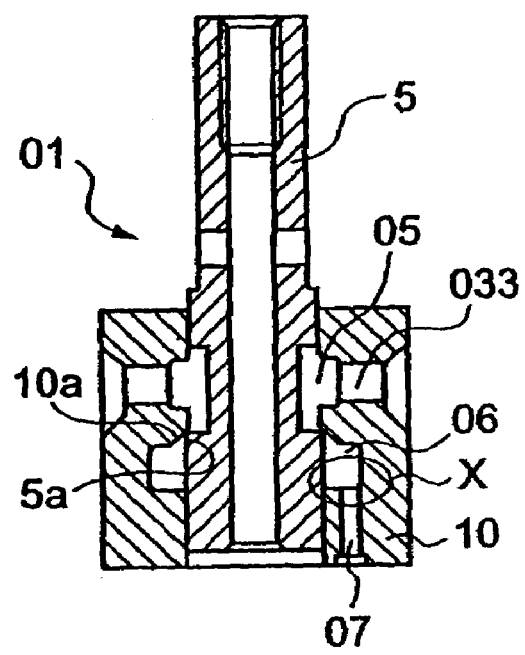
FIG. 1(A) is a sectional view of a first embodiment of the poppet valve device according to the present invention.
Figure 1B:
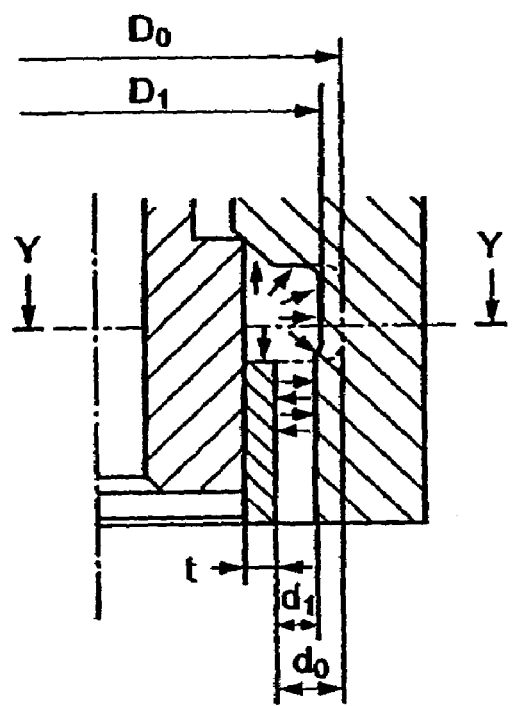
FIG. 1(B) is an enlarged detail of part X in FIG. 1A and shown in comparison with the case of prior art.

FIG. 1(A) is a sectional view of a first embodiment of the poppet valve device according to the present invention. FIG. 1(B) is an enlarged detail of part X in FIG. 1(A) and shown in comparison with the case of prior art, and FIG. 1(C) is a section along line Y-Y in FIG. 1(B) and the case of present invention is compared with the case of prior art.

Figure 7A:
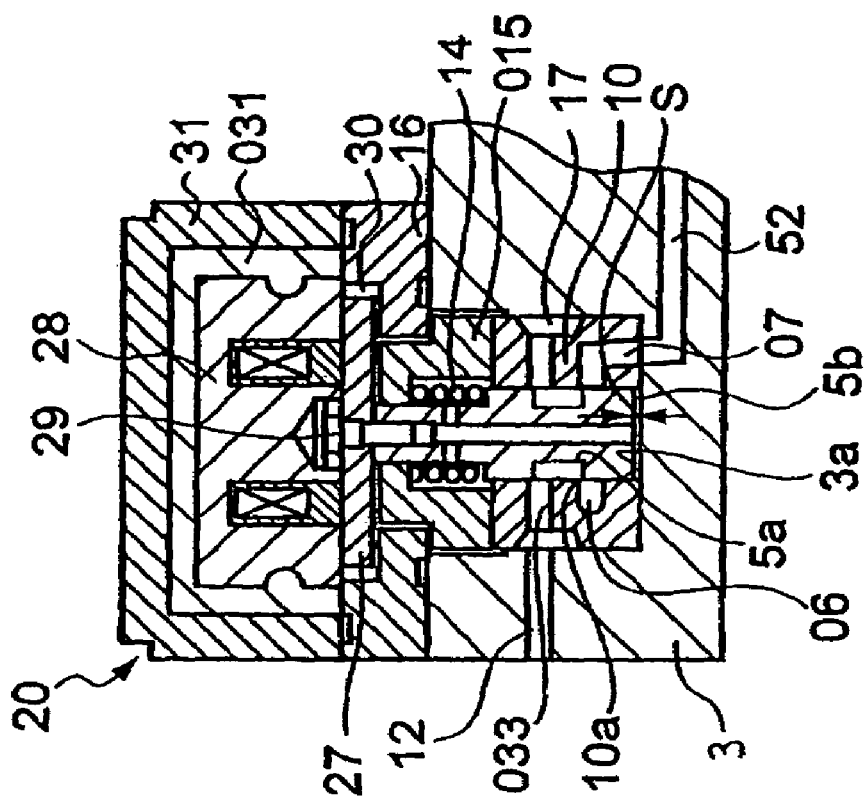
FIG. 7(A) is a sectional view of a poppet valve device of prior art showing the state the valve is opened.
Figure 7B:
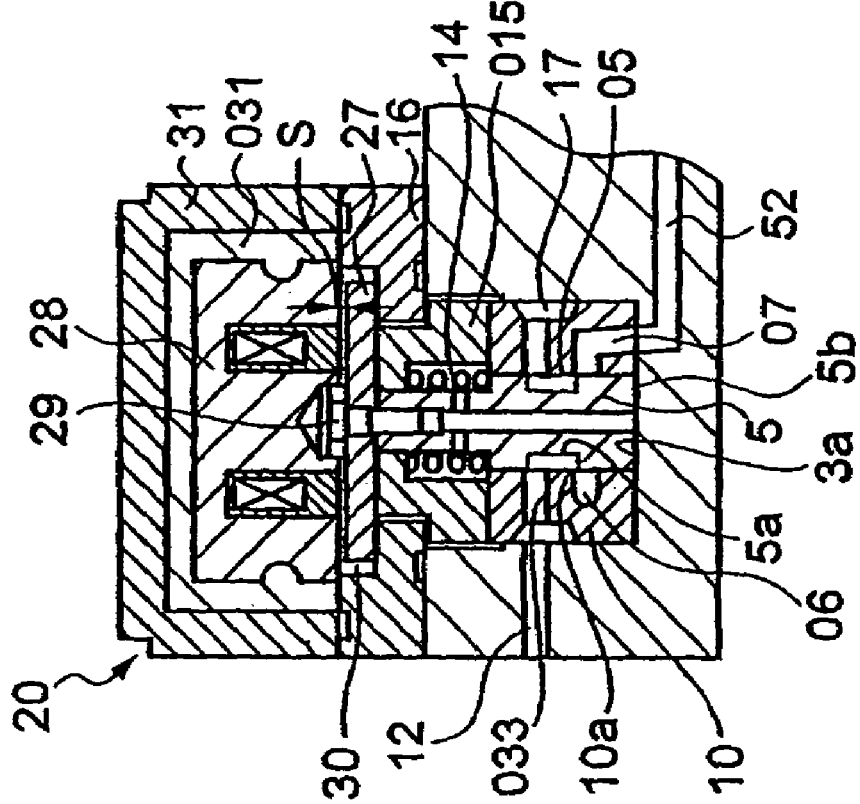
FIG. 7(B) is a sectional view of a poppet valve device of prior art showing the state the valve is closed.

In FIG. 1(A), a poppet valve device 01 consists of a poppet valve body 5 and valve seat member 10. Reference numeral 05 is a low-pressure room, 06 is a high-pressure room, 07 is an axial passage connecting to the high-pressure room 06, and 033 are radial passages connecting to the low-pressure room 05. These reference numerals are the same as those of the poppet valve device in FIG. 7. Arrows in FIG. 1(B) show the state fuel pressure is exerting in the high-pressure room 06.

Figure 1C:
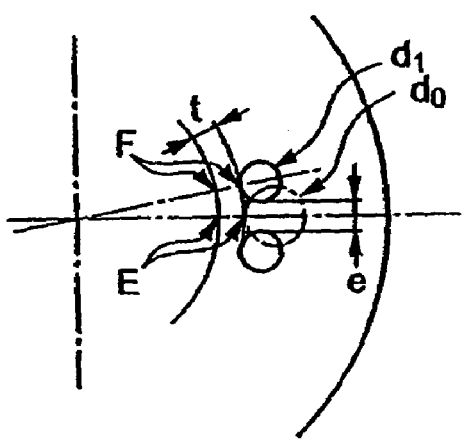
FIG. 1(C) is a section along line Y-Y in FIG. 1(B) and the case of present invention is compared with the case of prior art.

In FIG. 1(C), the case the axial passage 07 consists of two passages each having diameter $d_1$ is compared with the case the axial passage 07 is one passage of diameter of $d_0$. The area of two passages of diameter $d_1$ is equal to the area of one passage of diameter of $d_0$ in the drawing. In the case of one passage of diameter of $d_0$, maximum tensile stress occurs at E, and a crack occurs when the fuel pressure is high in the passage. In the case of two passages of diameter of $d_1$, maximum tensile stress occurs at F for each passage, however the tensile stress is smaller, for the diameter of the passage is smaller.

In addition, between the two passages of diameter of $d_1$, the tensile stress at F is reduced because the circumferential deformation due to the pressure in the two passages is canceled to each other.

As shown in FIG. 1(B), the diameter $D_1$ of the annular high-pressure room 06 can be reduced when the diameter of the axial passage 07 is $d_1$ in comparison with the case when the diameter of the axial passage 07 is $d_0$. Therefore, the volume of the high-pressure room 06 can be reduced. In FIG. 1(B) is shown the case two axial passages are provided, however, above mentioned effect is further enhanced by reducing the diameter of the axial passage with increased number of the axial passages.

The Second Embodiment

Figure 2:
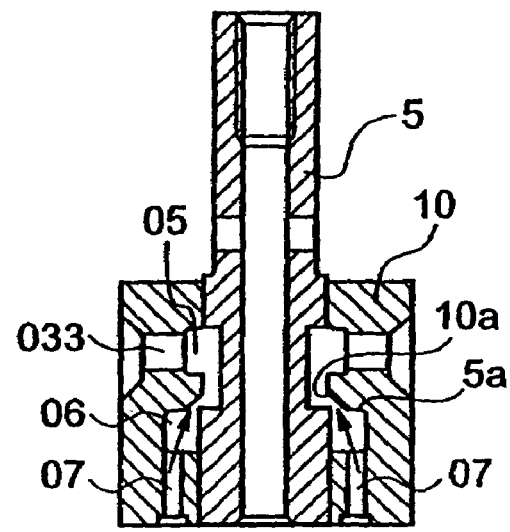
FIG. 2 is a sectional view of a second embodiment of the poppet valve device according to the present invention.

FIG. 2 is a sectional view of a second embodiment of the poppet valve device according to the present invention. In the drawing, two axial passages 07 of right and left are provided. Other than this point the poppet valve device of FIG. 2 is configured similar to that of FIG. 1(A), and the same reference numerals are used for components and function parts same or similar to those of FIG. 1(A). In this case, as high-pressure liquid flows into the high-pressure room 06 through the right and left axial passages 07 at the same time, the poppet valve body 5 experiences pressure from the high-pressure liquid flow at the same time from right and left, and the poppet valve body 5 does not experience a side thrust as does in the case only one axial passage is provided.

Therefore, the increase of friction by a side thrust when the poppet valve body slides in the valve seat member 10 can be prevented.

When the valve opens, the liquid in the high-pressure room 06 flows out to the low-pressure room 05 passing through the annular gap developed between the seat face 5a of the poppet valve body 5 and the seat face 10a of the valve seat member 10 as indicated by arrows in FIG. 2. Because high-pressure liquid flows into the high-pressure room 06 through the axial passage or passages, liquid flow into the low-pressure room tends to become strong in the part of the annular gap between the seat faces nearest to the axial passage or passages, and the velocity of the flow is largest at that part. As two right and left axial passages are provided in the case of FIG. 2, the amount of liquid flow per one passage is halved in comparison with the case only one axial passage is provided, and the collision energy of the liquid flow impinging against the poppet valve body is dispersed in two portions.

Therefore, the occurrence of cavitation erosion is prevented or moderated. Two right and left axial passages are provided in FIG. 2, however, if a plurality of axial passages more than two are provided in axial symmetry, the effect is further enhanced.

The Third Embodiment

Figure 3:
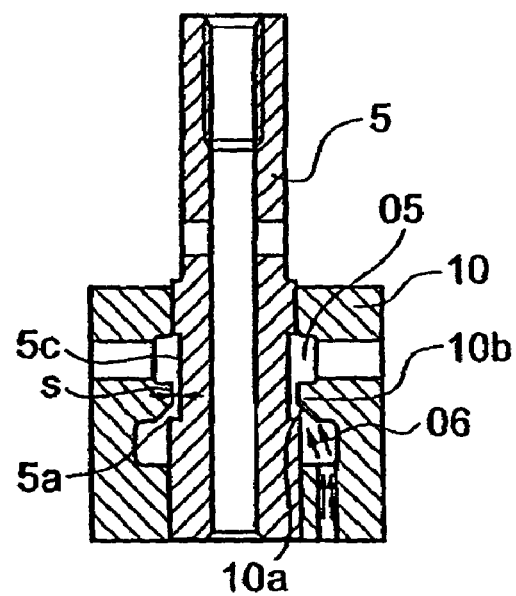
FIG. 3 is a sectional view of a third embodiment of the poppet valve device according to the present invention.

FIG. 3 is a sectional view of a third embodiment of the poppet valve device according to the present invention, and the same reference numerals are used for components and function parts same or similar to those of FIG. 1(A). A point different from the poppet valve device of FIG. 1(A) is that the width "s" of the annular gap between the periphery 5c of the middle part of the poppet valve body 5 and the inside perimeter of the annular projection 10b of the valve seat member 10 for forming the valve seat 10a is narrowed to throttle liquid flow.

When the seat face 5a of the poppet valve body 5 departs from the seat 10a of the valve seat member 10 and a gap is developed between the seat faces, high-pressure liquid flows out from the high-pressure room 06 to the low-pressure room 05 passing through the gap between the seat faces and further passing through the annular gap of width "s". When the annular gap of width "s" is narrowed, the flow through the annular gap is restricted by the narrow annular gap, and flow energy of liquid is also restricted, so that the collision energy of the liquid flow impinging against the periphery 5c of the middle part of the poppet valve body 5 is also restricted.

Therefore, the occurrence of cavitation erosion is prevented or moderated. However, if the flow through said annular gap is restricted excessively, the velocity of pressure drop of the high-pressure fuel in the injection pump becomes slower, which results in poor sharpness of injection end. Therefore, the width "s" of the annular gap must be determined to be not too small.

In the poppet valve devices of prior art, such a consideration as to provide a throttled part as mentioned above has not been made heretofore.

The Fourth and its Modified Embodiments

FIG. 4(A), FIG. 4(B), and FIG. 4(C) show the fourth embodiment and its modified embodiments. Each gives the similar effect.

In FIG. 4(A) and FIG. 4(B), the poppet valve device is shown in the state the lower end face of the valve seat member 10 contacts the bottom 3a of the poppet valve device accommodating part of the fuel injection apparatus. In the drawings, the same reference numerals are used for components and function parts same or similar to those of FIG. 1(A) and explanation is omitted. Although the lower end part of the poppet valve body 5 and shape of the bottom face 3a of the poppet valve device accommodating part is different in each of FIG. 4(A), (B), and (C), the same reference numerals are used for those for convenience sake.

Figure 5:
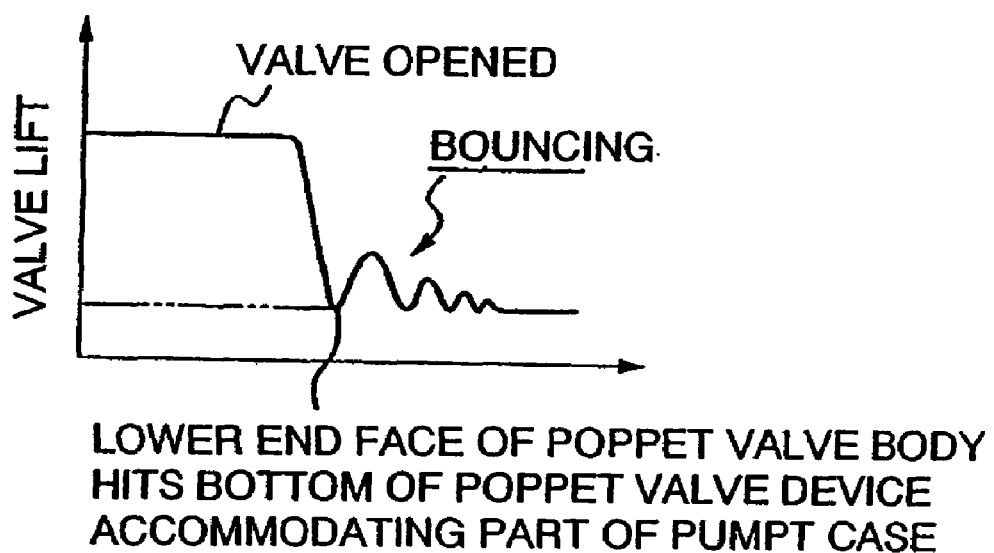
FIG. 5 is a graph showing the bouncing of poppet valve.
Figure 6:
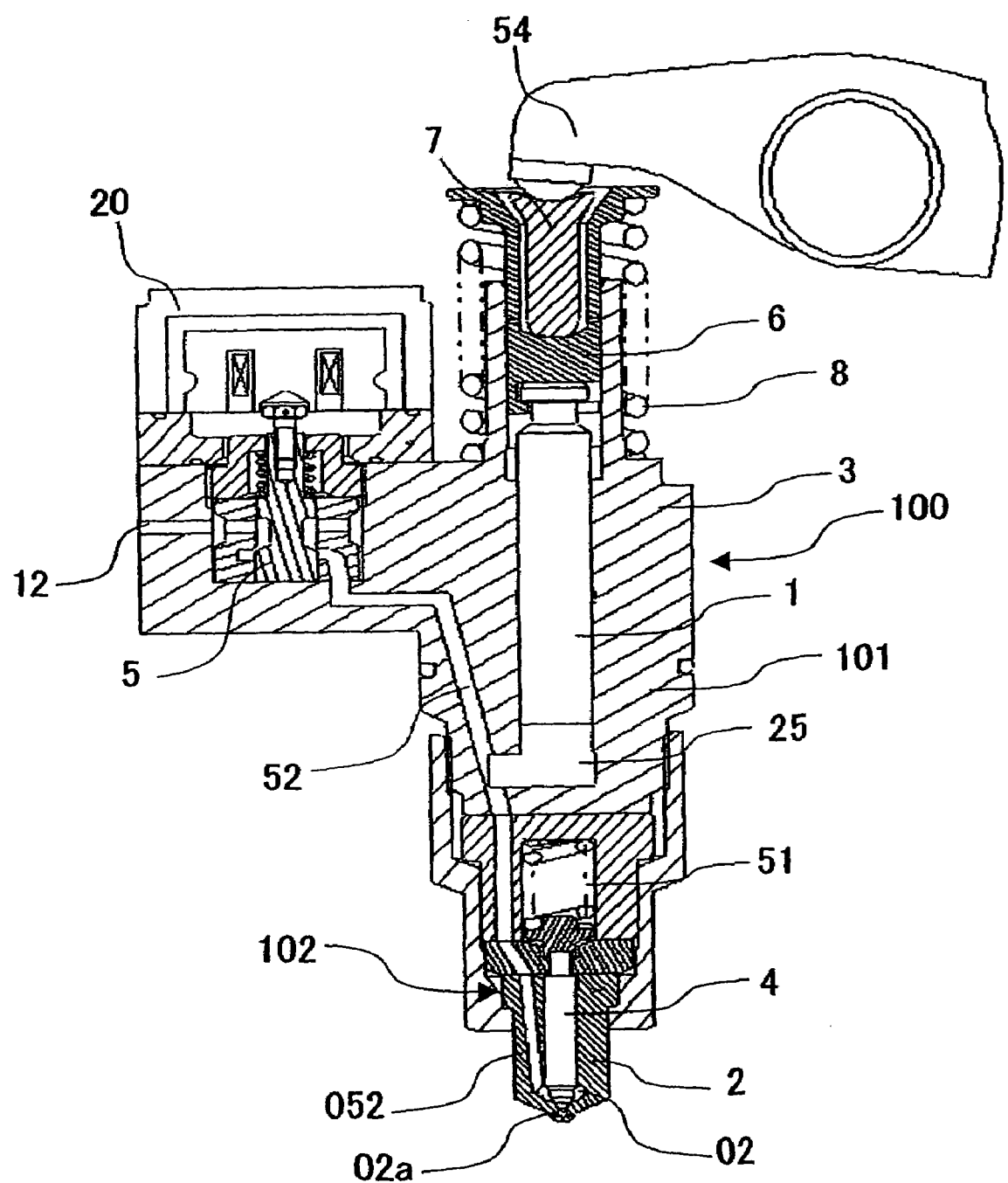
FIG. 6 is a schematic representation of a unit injector type electronic fuel injection apparatus for a diesel engine.

Generally, bouncing occurs when the poppet valve opens, that is, the poppet valve body 5 is pushed down by the spring force until the lower end face 5b thereof impacts upon the bottom face 3a of the valve device accommodating part and then rebound. The state bouncing is occurring is shown in FIG. 5. The embodiments of FIG. 4(A) to FIG. 4(C) are configured to prevent the occurrence of bouncing or alleviate bouncing by lessening the impact when the poppet valve body 5 hits the bottom 3a.

The poppet valve body 5 is provided with a central hollow 115 and lateral holes 116 as shown in FIG. 4(A) to FIG. 4(C) to allow the fuel between the lower end face 5b of the poppet valve body and the bottom face 3a of the valve device accommodating part to escape through them when the poppet valve body 5 moves down and collide on the bottom face 3a. In the embodiment of FIG. 4(A), a cylindrical projection 103 is formed on the bottom 3a of the valve device accommodating part and the central hollow 115 of the poppet valve body 5 is enlarged in diameter at the lower end part thereof to form an enlarged hole 117 so that the cylindrical projection 103 fits into the enlarged hole 117 with a small radial clearance to form an annular clearance of small radial width when the poppet valve body 5 moves down until the lower end face 5b comes into contact with the bottom face 3a.

Therefore, when the poppet valve body 5 moves down, the fuel between the lower end face 5b thereof and the bottom face 3a of the valve device accommodating part escapes toward the central hollow 115 passing through said narrow annular clearance.

Accordingly, there occurs resistance for the poppet valve body to move down, descending velocity thereof is reduced, and the impact when the lower end face 5a of the poppet valve body collides on the bottom face 3a of the valve device accommodating part is lessened. The diameter of the cylindrical projection 103 and enlarged hole should be determined such that the descending velocity is not excessively reduced. The velocity in the gap between the valve seat faces increases is reduced by the reduction in descending velocity of the poppet valve body, therefore, the energy of fuel flow through the gap between the valve seat faces is reduced, which effects to reduce the potential for cavitation erosion.

In the embodiment of FIG. 4(B), a cylindrical recess 104 is formed in the bottom face 3a of the valve device accommodating part and a cylindrical projection 118 is provided at the lower end part of the poppet valve body 5 so that the cylindrical projection 118 fits into the cylindrical recess 104 with small radial clearance to form an annular gap of small radial width when the poppet valve body 5 moves down until the lower end face 5b contacts the bottom face 3a. The work and effect of this embodiment are similar to those of the embodiment of FIG. 4(A).

In the embodiment of FIG. 4(C), an orifice 105 having a small hole 106 is attached to the lower end part of the central hole 115 of the poppet valve body 5, and the work and effect of this embodiment are similar to those of the embodiment of FIG. 4(A).

As has been described in the foregoing, the poppet valve device according to the invention can prevent the occurrence of damage in a high-pressure liquid passage of the valve device, increase in sliding friction due to the occurrence of a side thrust, occurrence of cavitation erosion, and occurrence of bouncing even when the valve device is applied to open and close a passage exposed to high-pressure liquid. Particularly, when the valve device is used for an electronic controlled fuel injection apparatus, an electronic controlled fuel injection apparatus superior in durability can be obtained without using material higher in grade than that used conventionally.

The invention claimed is:

1. A poppet valve device for opening and closing a high-pressure liquid passage, said poppet valve device comprising:
    a valve seat member; and
    a poppet valve body inserted in a through-hole of said valve seat member for sliding in said through-hole, wherein:
    said poppet valve device is configured such that positioning a seat face of said poppet valve body onto a seat face of said valve seat member separates an annular, high-pressure room from an annular, low-pressure room, said annular rooms being formed between said poppet valve body and said valve seat member;
    said valve seat member includes an axial passage that communicates with said high-pressure room and a radial passage that communicates with said low-pressure room;
    said poppet valve body includes a central hollow that extends from a lower end face of said poppet valve body to a top end of said poppet valve body and is for allowing liquid fuel leaked due to sliding between said valve seat member and said poppet valve body to escape to said top end of said poppet valve body from said lower end face of said poppet valve body;
    a seat gap is formed between said seat face formed on a periphery of said poppet valve body and an inside perimeter of an annular projection of said valve seat member;
    an annular gap is positioned lower than said seat gap in a downstream direction and is formed between said periphery of said poppet valve body in a middle part thereof and said inside perimeter of said annular projection of said valve seat member; and
    a radial width of said annular gap is narrowed to restrict liquid fuel flow from said high-pressure room to said low-pressure room so that the occurrence of cavitation erosion is suppressed.

2. An electronic controlled fuel injection apparatus provided with said poppet valve device of claim 1, wherein:

said valve seat member is fixed to a valve device accommodating part so that a bottom end of said valve seat member is in close contact with a bottom face of said valve device accommodating part;

said poppet valve body is forced by an elastic member in a direction of departure of said seat face of said poppet valve body departing from said seat face of said valve seat member; and an electromagnetic valve is provided so that said poppet valve device is closed when said poppet valve body is attracted by said electromagnetic valve against the elastic force of said elastic member to allow said seat face of said poppet valve body to sit on said seat face of said valve seat member and said poppet valve device is opened when the attraction of said electromagnetic valve is released to allow said seat face of said poppet valve body to depart from said seat face of said valve seat member.

3. The electronic controlled fuel injection apparatus according to claim 2, wherein said central hollow further allows the liquid fuel leaked from sliding a sliding part of said poppet valve body in said trough-hole of said valve seat member to escape to a poppet valve spring accommodating room, and a cylindrical projection is formed on said bottom of said valve device accommodating part so that said cylindrical projection can fit in said central hollow of said poppet valve body with a radial clearance, such that when a lower end face of said poppet valve body collides against said bottom face of said valve device accommodating part the impact is lessened and bouncing of said poppet valve body is prevented.

4. The electronic controlled fuel injection apparatus according to claim 2, wherein said poppet valve body has a cylindrical projection smaller in diameter than that of a sliding part thereof at said lower end part thereof and said central hollow further allows the liquid fuel leaked from sliding said sliding part in said trough-hole of said valve seat member to escape to a poppet valve spring accommodating room, and a cylindrical recess is provided in said bottom of said valve device accommodating part so that said cylindrical projection of said poppet valve can fit into said cylindrical recess with a radial clearance, such that when a lower end face of said poppet valve body collides against said bottom face of said valve device accommodating part the impact is lessened and bouncing of said poppet valve body is prevented.

5. The electronic controlled fuel injection apparatus according to claim 2, wherein said central hollow further allows the liquid fuel leaked from sliding a sliding part of said poppet valve body in said trough-hole of said valve seat member to escape to a poppet valve spring accommodating room, and said poppet valve body is provided with a throttling member to throttle liquid flow into said central hollow of said poppet valve body, such that when a lower end face of said poppet valve body collides against said bottom face of said valve device accommodating part the impact is lessened and bouncing of said poppet valve body is prevented.

* * * * *